United States Patent
Berman

(10) Patent No.: US 10,408,487 B1
(45) Date of Patent: Sep. 10, 2019

(54) SECONDARY CONTROLLER FOR VENTILATION SYSTEMS AND INTEGRATED VENTILATION SYSTEMS

(71) Applicant: Mark J. Berman, Davis, CA (US)

(72) Inventor: Mark J. Berman, Davis, CA (US)

(*) Notice: Subject to any disclaimer, the term of this patent is extended or adjusted under 35 U.S.C. 154(b) by 0 days.

(21) Appl. No.: 16/377,623

(22) Filed: Apr. 8, 2019

(51) Int. Cl.
*G05D 23/00* (2006.01)
*F24F 11/77* (2018.01)
*F24F 11/00* (2018.01)
*F24F 11/63* (2018.01)
*F24F 11/523* (2018.01)

(52) U.S. Cl.
CPC .......... *F24F 11/77* (2018.01); *F24F 11/0001* (2013.01); *F24F 11/523* (2018.01); *F24F 11/63* (2018.01); *F24F 2011/0002* (2013.01)

(58) Field of Classification Search
CPC .................................................. F24F 11/0086
USPC .......................................................... 700/276
See application file for complete search history.

(56) References Cited

U.S. PATENT DOCUMENTS

| | | | | |
|---|---|---|---|---|
| 6,126,540 A * | 10/2000 | Janu | ............ | F24F 11/74 454/229 |
| 7,398,821 B2 * | 7/2008 | Rainer | ............ | G05D 23/1931 165/247 |
| 8,364,318 B2 * | 1/2013 | Grabinger | ............ | F24F 11/0001 700/276 |
| 8,918,218 B2 * | 12/2014 | Grabinger | ............ | F24F 11/0001 700/276 |
| 9,322,568 B2 * | 4/2016 | Aycock | ............ | F24F 11/0001 |
| 9,500,382 B2 * | 11/2016 | Grabinger | ............ | F24F 3/044 |
| 9,746,199 B1 * | 8/2017 | Drees | ............ | F24F 11/30 |
| 2004/0253918 A1 * | 12/2004 | Ezell | ............ | F24F 11/30 454/239 |
| 2008/0110187 A1 * | 5/2008 | Han | ............ | F24F 11/30 62/159 |
| 2014/0324230 A1 * | 10/2014 | Zhao | ............ | F24F 11/89 700/276 |
| 2014/0371918 A1 * | 12/2014 | Douglas | ............ | G05D 7/0676 700/276 |
| 2015/0241111 A1 * | 8/2015 | Zinger | ............ | F25D 21/006 62/80 |
| 2019/0101302 A1 * | 4/2019 | Rainone | ............ | F24F 11/0001 |

OTHER PUBLICATIONS

Joseph Lstiburek, BSI-012: Balancing Act—Exhaust—Only Ventilation Does Not Work, Aug. 15, 2016, Building Science Corporation, pp. 10 (Year: 2016).*
Building Science Corporation, Info-610: Central Fan Integrated Ventilation Systems, Apr. 24, 2010, pp. 6 (Year: 2010).*
Zehnder, Why Ventilation Should Be Separate From Heating and Cooling Systems, Aug. 17, 2015, Zehnder, pp. 3 (Year: 2015).*

* cited by examiner

*Primary Examiner* — Suresh Suryawanshi
(74) *Attorney, Agent, or Firm* — Oliff PLC

(57) ABSTRACT

A secondary controller that controls a secondary device and is used with a primary controller that controls a primary device. The secondary controller detects primary control signals sent to or from the primary controller, and controls the secondary device based on the detection such that the secondary device does not operate when the primary device is operating, or so that the secondary device operates in a relatively lesser capacity when the primary device is operating. Also described is an outdoor air cooling and ventilation apparatus for supplying outdoor air to an indoor space, which may optionally be used with the secondary controller.

22 Claims, 4 Drawing Sheets

SECONDARY CONTROLLER FOR VENTILATION SYSTEMS AND INTEGRATED VENTILATION SYSTEMS

BACKGROUND

Existing ventilation systems for buildings that are integrated with forced air heating, ventilation, and/or air conditioning (HVAC) systems have one or more deficiencies. These may include the introduction of cold outside air to the furnace or HVAC device, creating the potential for excessive condensate, a cracked heat exchanger, or other conditions that lead to system failure. Existing systems are not typically able to accommodate more than one return air duct, while many of today's HVAC systems require two or more return air ducts.

Existing integrated ventilation systems utilize the blower of the furnace/HVAC device to draw in outside air and supply it to the conditioned space, typically necessitating modification of the furnace/HVAC device controls to accommodate this supplementary usage of the blower. Otherwise, if a second controller is employed, the blower could receive conflicting signals output from the two controllers, which could cause the blower and/or furnace/HVAC device to malfunction, operate incorrectly, or become disabled. The design of furnace/HVAC device controls varies by brand and model, thus necessitating a large number of varying controls modifications to enable the integration of a ventilation system with multiple furnace/HVAC device brands and models. This can add significant development, manufacturing and logistical costs to the provision of integrated ventilation systems, limiting market penetration and perpetuating poor indoor air quality and high cooling energy use in buildings. In addition, existing integrated ventilation systems typically require use of a custom thermostat. This also can limit usage, as many users already own or prefer one of the many commonly available thermostats.

SUMMARY

In accordance with some aspects of the invention, a secondary controller is provided for use in an HVAC system that provides air to a conditioned space. The HVAC system further includes a primary controller that receives primary input signals from a thermostat and sends primary output signals to control at least one primary device that supplies heated and/or cooled air to the conditioned space. The primary device may be one or more of a heater, a cooler, and a primary blower that blows the heated and/or cooled air. The secondary controller is configured to send secondary control signals to control at least one secondary device that is configured to supply outdoor air to the conditioned space. The secondary device may be one or more of an outdoor air damper in communication with the outdoor air and a secondary blower that blows the outdoor air. The secondary controller includes a processor that is programmed to: (a) determine at least one of (i) whether the primary input signals are being sent to the primary controller, and (ii) whether the primary output signals are being sent from the primary controller; and (b) send secondary control signals to control the at least one secondary device, where the secondary control signals are based on the determination in (a).

In some aspects of the invention a secondary controller is provided that controls at least one secondary device that supplies outdoor air to an interior space. The secondary controller is configured to be used with a primary controller that controls at least one primary device that supplies heated and/or cooled air to the interior space. The secondary controller is configured to detect primary control signals sent to and/or from the primary controller, and is configured to control the at least one secondary device based on the detection such that the at least one secondary device (i) does not supply outdoor air when the at least one primary device is supplying cooled and/or heated air; or (ii) operates at a lesser capacity to supply relatively lesser outdoor air when the at least one primary device is supplying cooled and/or heated air as compared with when the secondary device is operating at full capacity.

In other aspects of the invention, an outdoor air cooling and ventilation apparatus is provided for supplying outdoor air to an indoor space. The apparatus includes a single housing with (i) an outdoor air inlet that is configured to receive the outdoor air into the housing; (ii) an outdoor air damper positioned downstream of the outdoor air inlet, which is able to regulate the flow of the outdoor air in the housing; (iii) an outlet that is configured to supply the outdoor air to the indoor space; (iv) a fan with a fan motor that is configured to draw in the outdoor air through the outdoor air inlet and blow the outdoor air to the outlet; (v) a conditioned air inlet that is configured to receive conditioned air from an HVAC system into the housing; and (vi) a conditioned air damper that is positioned downstream of the conditioned air inlet, which is able to regulate the flow of the conditioned air in the housing.

BRIEF DESCRIPTION OF THE DRAWINGS

Various exemplary embodiments of the systems and methods of this invention will be described in detail, with reference to the following figures, in which.

DETAILED DESCRIPTION

Various aspects of the invention provide devices, systems, and methods for:

supplying outside air to a conditioned space of a building for ventilation and/or ventilation cooling without introducing said outside air to the furnace or heat exchanger;

mixing outside air with supply air conditioned by the furnace/HVAC device before the supply air is distributed and introduced to the conditioned space;

modulating the amount of outside air supplied;

filtering outside air supplied for ventilation with a filter that is easily accessible for cleaning and/or replacement;

controlling the provision of outside air for ventilation and/or ventilation cooling in a manner that is coordinated with the operation of the furnace/HVAC device so as to avoid conflicts with the operation of the furnace/HVAC device;

providing a path for air to exit the conditioned space in order to balance air pressure as outside air is supplied;

accommodating systems with multiple return air ducts;

accommodating various brands and models of furnace/HVAC devices without the need to customize the controls or controls program of each such furnace/ HVAC device or the need to design multiple versions of the controls or controls program of the present invention;

adding outdoor ventilation and ventilation cooling capability in an add-on system to a pre-existing HVAC system without having to redesign, change or modify the preexisting system, including the preexisting system's controller, logic, wiring and/or its functionality;

providing a ventilation system in one assembly for ease of manufacture and installation; and controlling HVAC devices for operations in addition to the operations controlled by the primary HVAC controller, while avoiding any interference with the primacy of the primary controller and the signals it sends to said devices.

Figure 1:
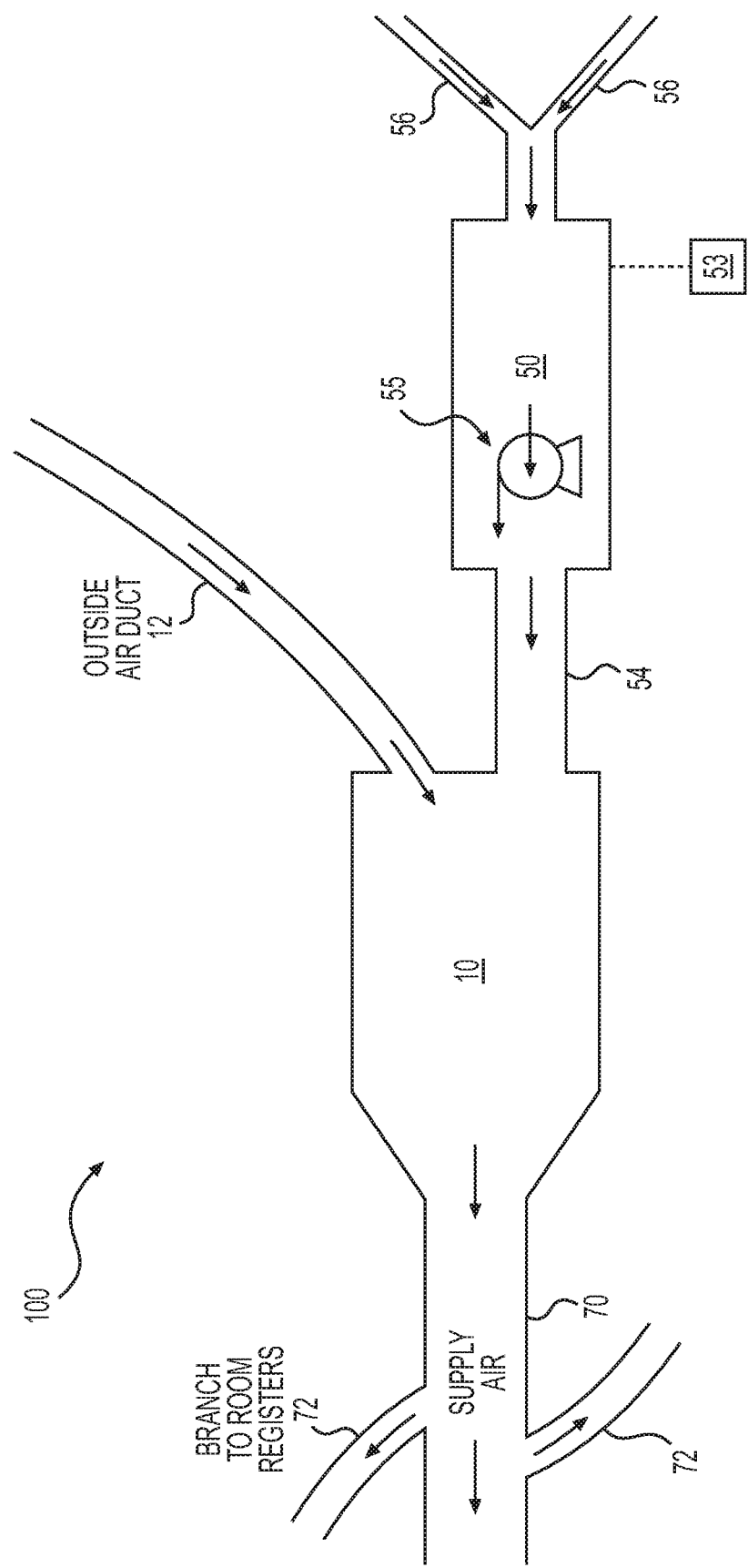
FIG. 1 is a schematic diagram of an HVAC system for a building, including an integrated ventilation system.

FIG. 1 is a schematic diagram illustrating an exemplary HVAC system 100 for a building. The HVAC system includes (i) a furnace and/or HVAC device 50 for heating or cooling the building, that is in fluid communication with (ii) an integrated ventilation system 10 for providing outdoor air ventilation and/or ventilation cooling. The HVAC device 50 is fed with one or more return air ducts 56 transporting air from the return air register(s) to the furnace/HVAC device 50 for heating or cooling. The furnace/HVAC device 50 can include a heat exchanger and/or cooling coil. It may also include a blower 55, which is a fan driven by a motor. The furnace/HVAC device can be controlled by primary controller 53, which is typically a control panel that is integrated onto the furnace/HVAC device that communicates and receives signals from a thermostat.

The furnace/HVAC output is fed to the integrated ventilation system 10 via output duct 54. The integrated ventilation system 10 is further fed with outside air from outside air duct 12. The outside air is used for ventilation and/or ventilation cooling of the conditioned space. The outside air duct 12 is connected at its intake to a source of outside air, such as a gable vent, and is connected at its output to the integrated ventilation system 10. The output of the integrated ventilation system 10 is fed to supply air duct 70. The integrated ventilation system 10 can be positioned downstream of the furnace/HVAC device 10 so that 100% outside air can be supplied to the building as supply air or so that 100% conditioned air can be supplied as supply air or so that outside air can be mixed with conditioned air from the furnace HVAC device 50 as supply air. (The terms "downstream" and "upstream" as used herein describe the location relative to the direction of air flow in the particular passage or device). The supply air is provided to the building via supply air duct 70 and various supply branch ducts 72.

Outside air can be introduced into the building without having to pass the outside air into furnace/HVAC device. This eliminates the possibility of cold outside air being introduced into a hot heat exchanger and causing cracking of the heat exchanger or causing excessive condensate to form, either of which can be detrimental to the operation and/or safety of the furnace/HVAC device 50. This placement also enables the use of multiple return air ducts without any modification to the HVAC system 100.

Figure 2:
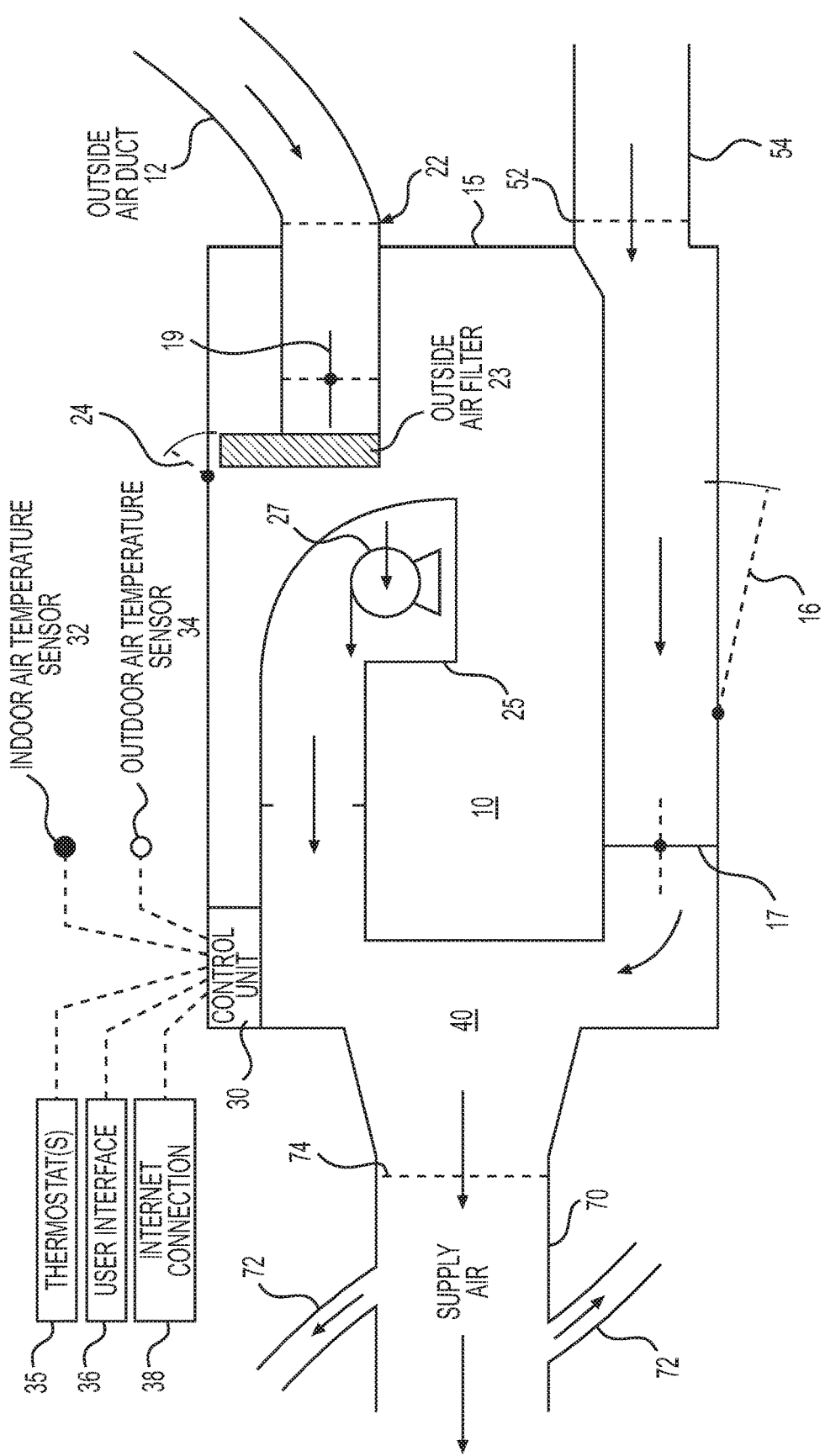
FIG. 2 is a schematic diagram of an integrated ventilation system.

FIG. 2 illustrates an embodiment of the integrated ventilation system 10 in greater detail. In this embodiment, the integrated ventilation system 10 and its components are a stand-alone device that is incorporated into a single cabinet 15, which consist of a single housing. The single housing aids in easy installation of the ventilation system 10 with existing HVAC systems. The cabinet can house a ventilation blower 27 with a single speed or variable speed motor, a control unit 30, a plenum 40, a connection 74 to supply air duct 70, an outside air filter 23, a door 24 to access the outside air filter 23, a connection 22 for an outside air supply duct 12, an outside air damper 19, a connection 52 for an output duct 54 from the furnace/HVAC device, a furnace HVAC air damper 17, a relief air damper 16 that opens through the cabinet wall to the surrounding space. The cabinet may be sized to be less than 6 cubic feet, less than 4 cubic feet, or less than 3 cubic feet.

In some embodiments, an ultraviolet air purifier is included in the plenum 40. In other embodiments, the filter 23 can be included in the plenum 40 so as to filter supply air emanating from the furnace as well as ventilation supply air.

In some embodiments, the cabinet 15 is rotatable and can be installed on one or more of its sides.

In some embodiments, the outdoor air filter is accessible for cleaning or replacement through the bottom of the cabinet 15 and through the ceiling of the room above which it resides. In some embodiments, the outdoor air filter is accessible through a side and/or through the top of the cabinet 15 instead of or in addition to access through the bottom of the cabinet.

In some embodiments, the ventilation system can be built in two cabinets, one connected to the furnace output duct 54 and the other connected to the outdoor air duct 12, with the output of the two compartments being joined via a "Y" shaped duct or through a plenum;

In some embodiments, a central outside air duct can be pressurized by a central blower and motor and can supply outside air to multiple ventilation units, for example in a multi-family building. In this design, there is no secondary blower and motor included in the cabinet and the volume of outside air supplied to the conditioned space is regulated by control ling the position of the outside air damper.

In some embodiments, relief air can be ducted from the cabinet 15 or otherwise to a central exhaust air duct, which may also have a central exhaust air fan and motor connected to it to draw out relief air.

In some embodiments, a relief air damper is installed through an exterior wall or through a ceiling in the conditioned space of the building instead of or in addition to the relief air damper included in the cabinet 15.

The control unit 30 can be connected to an outdoor air temperature sensor 34, an indoor air temperature sensor 32, thermostat(s) 35 that are also connected to the associated furnace/HVAC device, and a user interface 36. The control unit 30 may also have or be connected to an internet connection 38 to receive information from the internet. The control unit 30 can include a processor such as a CPU or an ASIC. The control unit 30 can also include or be in communication with a computer memory such as a hard drive or flash memory. In some embodiments, the control unit 30 may optionally include the secondary controller described in connection with FIGS. 3 and 4, below.

In one exemplary mode of operation, the integrated ventilation system 10 is controlled in a manner so as to supply outside air to the conditioned space via the supply air duct 70. When in this mode of operation, the outside air damper 19 is open, the blower 27 is on, the furnace air damper 17 is closed, and the relief air damper 16 is open. Outside air is drawn into the system by the blower 27, is filtered by the outside air filter 23, enters the ventilation ducting 25, is delivered to the plenum 40, then into the supply air duct 70 and then through supply branches 72 to the conditioned space.

Outside air is prevented from flowing back into the furnace by the closed furnace air damper 17. The outside air supplied to the conditioned space pressurizes the building, forcing relief air into the return register(s) and return duct(s) of the HVAC system 100. If the pressure is great enough, the return air will be pushed through the furnace, through the furnace output duct 54, to the relief air damper 16, where it will exit the system into the surrounding space, which in residential buildings is typically an attic or garage with relief air vents to the outside. In this way, the air pressure of the building will remain balanced.

In another exemplary mode of operation, the integrated ventilation system 10 is controlled in a manner so as not to disrupt the delivery of heated or cooled air from the furnace/HVAC device when the HVAC device is heating or cooling air. When in this mode of operation, the outside air damper 19 is closed, the ventilation blower 27 is off, the furnace air damper 17 is open, and the relief air damper 16 is closed. Conditioned air from the HVAC device is prevented from flowing back into the outside air duct by the closed outside air damper 19. The conditioned air is propelled through the furnace output duct 54 by the furnace blower. The conditioned air continues through the plenum 40, into the supply air duct 70 and then through supply branch ducts 72 to the conditioned space.

In another exemplary mode of operation, the integrated ventilation system 10 is controlled so as to mix outside air with conditioned air heated or cooled by the furnace/HVAC device 50. When in this mode of operation, the outside air damper 19 is partially or fully open, the ventilation blower 27 is on, e.g., at a low speed, the furnace air damper 17 is open and the relief air damper 16 is closed. Conditioned air from the furnace/HVAC device is propelled through the furnace output duct 54 by the furnace blower 55, outside air is drawn in by the ventilation blower 27 and then filtered by the outside air filter 23, both air supplies are delivered to the plenum 40, then into the supply air duct 70 and then through supply branch ducts 72 to the conditioned space. In this manner, outside air is mixed with conditioned air without introducing outside air to the furnace/HVAC device, which can present operational and/or safety issues. The amount of outside air introduced into the system can be regulated by the controller 30 of the ventilation system by regulating the speed of the ventilation blower 27 and/or by modifying the position of the outside air damper 19. The amount of outside air can thus be regulated without any modification to the controls or operation of the furnace/HVAC device 50, hence enabling the ventilation system to be used in conjunction with a wide variety of furnace/HVAC devices regardless of brand or model.

Another aspect of this disclosure is a stand-down or secondary controller that interfaces with at least one other primary controller and can be used with the integrated ventilation system of the invention or can be used with other HVAC systems.

As indicated above, the control unit 30 can be a secondary controller that is connected to an outdoor air temperature sensor 34, an indoor air temperature sensor 32, a user interface 36, and a thermostat(s) 35 that is in turn connected to the attached furnace/HVAC device 50. The secondary controller 30 is configured to monitor signals sent by the thermostat(s) 35 to the primary controller 53 of the furnace/HVAC device 50 for heating, cooling and operation of the device fan 55. If the secondary controller 30 detects ally such signals, it sends signals to the damper 17 in the furnace output duct causing that damper to be open and to the relief air damper 16 causing that damper to be closed. The secondary controller can then either:

a. Cause the ventilation blower 27 to be idle and the ventilation damper 19 in the ventilation air duct to be closed, or b. Cause the ventilation blower 27 to operate at a low speed and the damper 19 in the ventilation air duct to be open or partially open.

The secondary controller 30 can send these signals in accordance with its embedded program, the input signals the controller receives including temperature signals, and various settings stored in memory that are input to the controller 30 by the user through the user interface 36. One aspect of the invention can facilitate operation of the dampers and ventilation blower 27 of the ventilation system 10 using an independent, dedicated controller 30 and such that their operation does not interfere with or affect the operation of the associated furnace/HVAC device 50.

In other embodiments, the controller can download forecast weather and temperature data from the internet and utilize such data as input to the controls program to adjust operation of the ventilation system.

In other embodiments, the secondary controller is designed to receive, monitor and possibly transmit signals sent to the controller of another, independent, primary system, with the output signals of the secondary controller varying depending upon the signals, or lack thereof, detected as being sent to the primary controller. Such output signals from the secondary controller can be used to operate a secondary system in a manner that is coordinated with the operation of the primary system. Such output signals from the secondary controller can also be used to operate the primary system or a portion thereof in an alternative or complimentary manner to its typical operation.

Figure 3:
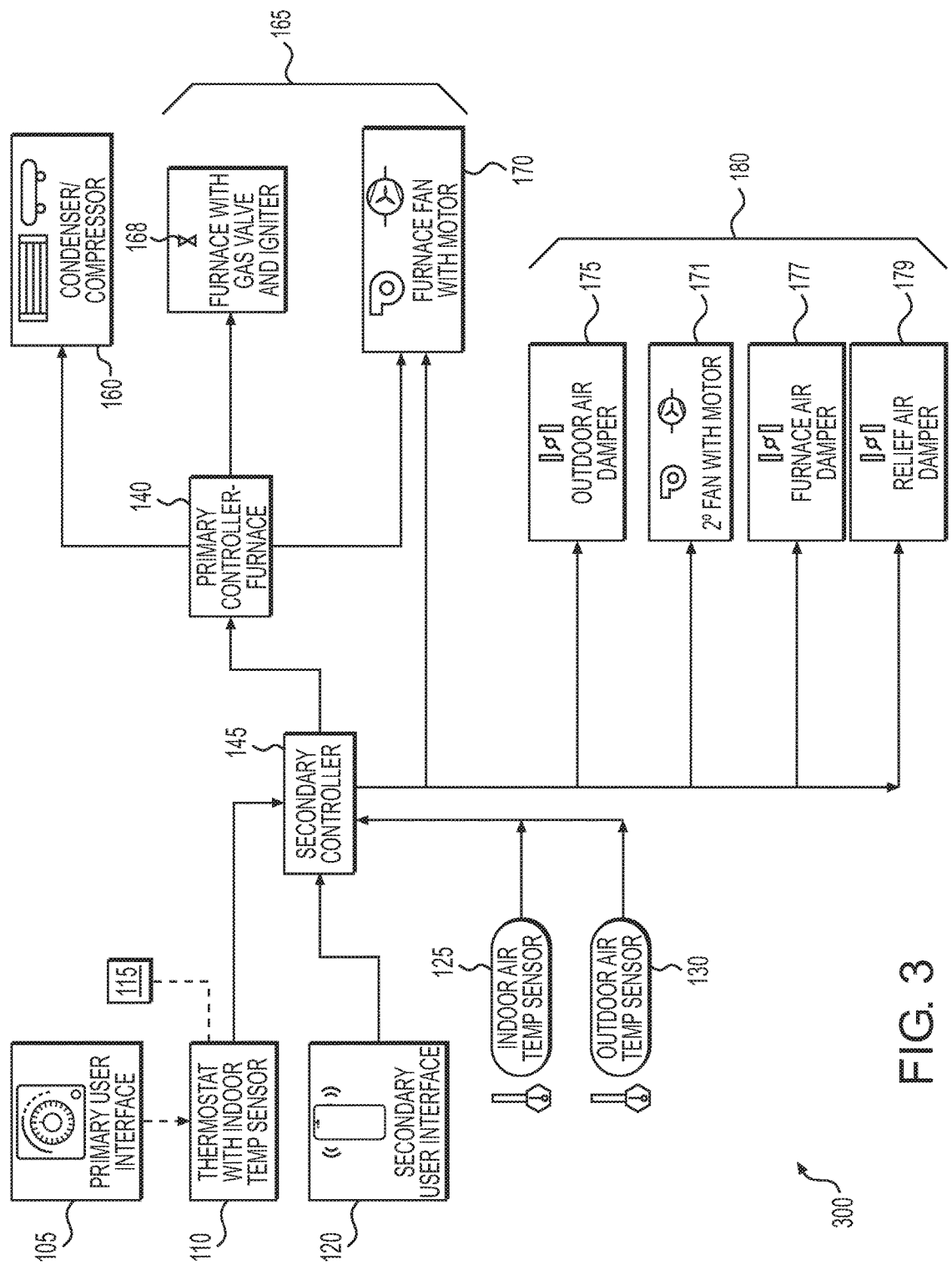
FIG. 3 is a schematic diagram illustrating the use of a secondary controller to control devices in an HVAC system.

FIG. 3 is a schematic diagram of an exemplary HVAC system 300 for a building. The system 300 includes a primary user interface 105 where a user of the HVAC system 300 inputs data such as heating setpoint(s), a thermostat 11 with an embodied indoor air temperature sensor 115, which may also incorporate the primary user interface 105, a furnace 165 including a gas valve and ignition device 168, a furnace fan and blower motor 170, which can be a variable speed motor in one embodiment, and a primary controller 140 which is typically built into the furnace as the furnace control board, and an outside air conditioning unit including a condenser and compressor 160. The aforementioned components are typical of HVAC systems. In another embodiment, the heating mechanism can be a heat pump instead of a furnace 165. In another embodiment of the current disclosure, the heating mechanism can be a hydronic fancoil instead of a furnace 165. In another embodiment, the cooling mechanism can be a hydronic fancoil.

The exemplary HVAC system 300 also includes the following items not generally found in typical HVAC systems: an indoor air temperature sensor 125, an outdoor air temperature sensor 130, an outdoor air damper 175, a secondary fan and blower motor 171, a furnace air damper 177, a relief air damper 179, a secondary user interface 120 which may consist of a computer program with displays that transmits information via Wi-Fi, Bluetooth or other communications protocols to a computer display and/or a smart phone display and/or a webpage and/or a user interface 120 that is a device affixed to a wall in the building or is portable within the building, and a secondary controller 145 which can receive inputs from the secondary user interface 120.

The secondary controller 145 can receive, monitor, and/or relay signals being sent from the primary user interface 105 and/or the thermostat 110 to the primary controller 140. As explained in greater detail below, the processor of the secondary controller 145 executes algorithms stored in its memory based on the inputs from the secondary user interface 120, the indoor air temperature sensor 125, the outdoor air temperature sensor 130, data downloaded from the internet, and signals from the primary user interface 105 and/or thermostat 110. Based upon these algorithms, the secondary controller 145 controls the operations of the outdoor air damper 175, the secondary fan and motor 171, the furnace air damper 177, and the relief air damper 179.

In an exemplary embodiment, a user of the HVAC system 300 will typically input data into the primary user interface 105 such as heating setpoint(s) and cooling setpoint(s). The thermostat 110 will compare indoor temperature readings measured by the indoor air temperature sensor 115 with the setpoints. If, for example, the indoor temperature falls below the active heating setpoint, then the thermostat 110 will send a signal to the primary controller 140. Such a signal is typically known as a heating call. Similarly, if the indoor temperature rises above the active cooling setpoint, then the thermostat 110 will send a cooling call signal to the primary controller 140. If a user inputs certain other settings into the primary user interface 105, then a fan call signal will be sent to the primary controller 140. Said signals from the thermostat 110 to the primary controller 140 are typically 24 volt electrical signals and are inputs to the primary controller 140. The primary user interface 105 and thermostat 110 can include, for example, traditional thermostats, smart thermostats, computer programs and applications that mimic thermostats, etc.

The primary controller 140 may be a furnace control board, which is typically an on-board system of the furnace that includes a processor, a memory, and a circuit board. The memory can be stored with algorithms that control outputs to the condenser/compressor 160, the gas valve and igniter 168, and furnace fan 170 based on received inputs such as heating calls, cooling calls, and fan calls. When the primary controller 140 receives a heating call, cooling call, or fan call signal as an input, it processes this data according to the algorithms programmed into the processor of the primary controller 140. The primary controller 140 then sends output signals to the appropriate components such as the condenser/compressor 160, or the gas valve and igniter 168 in the furnace 165, and the furnace fan with motor 170. The output signals, which are also typically 24 volts, vary as a function of the input signals received by the primary controller 140 as per the programs imbedded in its processor.

As an example, after receiving a heating call, the primary controller 140 may generate signals to partially open the gas valve 168 and activate the igniter in the furnace 165 and run the furnace fan 170 at a stage one (lower) speed. After a period of time per the algorithm, the primary controller 140 may signal the gas valve 168 in the furnace 165 to open further and may signal the furnace fan 170 to run faster, comprising a stage two heating level.

The programs imbedded in the processor of the primary controller 140 and the resulting sequence(s) of operations are typically considered proprietary by the furnace manufacturer. Likewise, the communications protocol used by the thermostat 110 to communicate with the primary controller 140 may also be proprietary.

In the current exemplary mode of operation, a user of the HVAC system 300 may want the system to automatically pre-cool the conditioned space using ventilation air. To accomplish this, the user inputs data into the secondary user interface 120 using, for example, a computer or smart phone which communicates with the secondary controller 145 via Wi-Fi or an equivalent communications system. The data input to the secondary user interface 120 can be transmitted to the processor in the secondary controller 145 via a read/write database programmed in SQL (Sequel) or another programming language. Data input by the user may include, for example (i) the maximum speed at which the furnace fan 170 should run when pre-cooling the conditioned space; (ii) the lowest acceptable indoor temperature when pre-cooling; and/or (iii) the minimum outside air temperature before ventilation operations are enabled.

In this mode of operation, an indoor temperature sensor 125 and an outdoor temperature sensor 130 also transmit readings to the database in the processor of the secondary controller 145. Thermostat 110 used by the primary controller 140 transmits heating calls, cooling calls and fan calls to the secondary controller 145 as electrical signals through wires, with, for example, one wire for heating calls, one wire for cooling calls and one wire for fan calls. If the secondary controller 145 detects a signal in any of these wires, it transmits that signal to the primary controller 140 in the form of an electrical signal to the appropriate relay or connection on the primary controller 140. Thus the signals from the thermostat 110 are input signals to the primary controller 140 as well as input signals to the secondary controller 145.

If the secondary controller 145 does not detect any signals coming from the thermostat 110 for input to the primary controller 140, then the secondary controller 145 may send output signals to operate the outdoor air damper 175 and the secondary fan and motor 171. The outputs sent by the secondary controller 145 will vary as a function of the inputs received by the secondary controller 145 and the algorithms programmed into and run by the processor of the secondary controller 145. The inputs to the secondary controller 145 also include temperature readings from the indoor air temperature sensor 125 and the outdoor air temperature sensor 130, weather forecasts and other data downloaded from the internet by the processor, as well as data values input by the user through the secondary user interface 120.

If, for example, the weather forecast indicates that the upcoming day will be hot, and if the outside air temperature sensor 130 indicates that the current outside temperature is cooler than the indoor temperature as measured by the indoor air temperature sensor 125, as often occurs in early morning hours, then the secondary controller 145 may signal the outdoor air damper 175 to open and also signal the secondary fan and motor 171 to run at a specific speed so that cool outside air is distributed to the conditioned space, thus pre-cooling the building. Simultaneously with operation of the secondary fan and motor 171, the secondary controller 145 would also signal the furnace air damper 177 to close and the relief air damper 179 to open.

In this example, pre-cooling the building reduces the need for the mechanical air-conditioner, including the condenser/compressor 160, to run the next day, thereby saving energy and money. Bringing in filtered fresh outdoor generally enhances the indoor air quality and comfort of the building. Pre-cooling the building and supplying fresh air to the conditioned space for ventilation are objects of this invention. This type of conditioning is described in greater detail, for example, in U.S. Pat. Nos. 7,992,630 and 7,398,821, the entireties of which are both incorporated herein by reference.

If the secondary controller 145 subsequently detects a signal being sent by the thermostat 110 as input to the primary controller 140, for example a cooling call to operate the condenser/compressor 160, then the secondary controller 145 will stand down and send signals to cease operation of the secondary fan and motor 171, to close the outdoor air damper 175, to open the furnace air damper 177 and to close the relief air damper 179. In this manner, the control regimen of and the primacy of the primary controller 140 are retained. All such signals are typically 24 volts.

In another exemplary mode of operation, whenever the secondary controller 145 detects signals from the thermostat 110, the algorithms of the secondary controller 145 prevent it from sending output signals to initiate operation of the secondary fan and motor 171, to open the outside air damper 175, to close the furnace air damper 177, and to open the relief air damper 179. In this manner, the primacy of the control regimen of the primary controller 40 is retained.

In another exemplary mode of operation, the secondary controller 145 is programmed so as to periodically mix outside air with conditioned air to be supplied to the conditioned space. In these circumstances, when the secondary controller 145 detects a cooling call or a heating call emanating from the thermostat 110, it will send signals that cause the secondary fan and motor 171 to operate at a prescribed speed, the outside air damper 175 to open or partially open, the furnace air damper 177 to open and the relief air damper 179 to close. In this manner both outside air and conditioned air will be supplied to the plenum where they will mix before moving through the supply air duct to the conditioned space.

In some embodiments, signals from the thermostat 110 can be sent to both the primary controller 140 and the secondary controller 145. The secondary controller 145 monitors such signals and uses them as input.

In other embodiments, the secondary controller 145 detects output signals from the primary controller 140 to the condenser/compressor 160, the furnace 165 and/or the furnace fan 170. The secondary controller 145 monitors such signals and uses them as input.

In other embodiments, the the thermostat 110 and/or primary controller 140 transmit heating calls, cooling calls, and fan calls to the secondary controller 145 via wireless communications.

In some embodiments, the secondary controller 145 may be programmed to interrupt heating or cooling signals sent to/from the primary controller 140 if continued operation of the heating and/or cooling device would result in critical situations such as a safety hazard or the failure of equipment.

The secondary controller 145 and ventilation system can be designed in some embodiments to meet minimum ventilation requirements specified by codes and/or standards, such as ASHRAE Standards 62.1 and 62.2.

In some embodiments, the program of the secondary controller 145 can be modified via signals sent through the internet to update the program and/or to modify operation of the ventilation system, e.g., in response to the requirements of a utility or some other central authority.

In some embodiments, the cabinet 15 is not included in the HVAC system and instead an outdoor air damper is positioned such that outdoor air can be drawn into the furnace using the furnace blower. The operation of the furnace blower for drawing in outdoor air is controlled by the secondary controller wherein the secondary controller monitors signals sent by the thermostat to the primary controller as described herein and the secondary controller operates the furnace fan in a manner that is complimentary to the manner in which primary controller operates the primary device, being the furnace/HVAC device including the furnace fan. Thus, for example, when the secondary controller detects that signals are emanating from the thermostat, it will stand down and will not send any signals to the furnace fan so as to retain the primacy of the primary controller and its control of the primary device. When, however, the secondary controller determines that there are no signals emanating from the thermostat and therefore the furnace blower is idle, the secondary will allow its algorithms to control the furnace blower.

Figure 4:
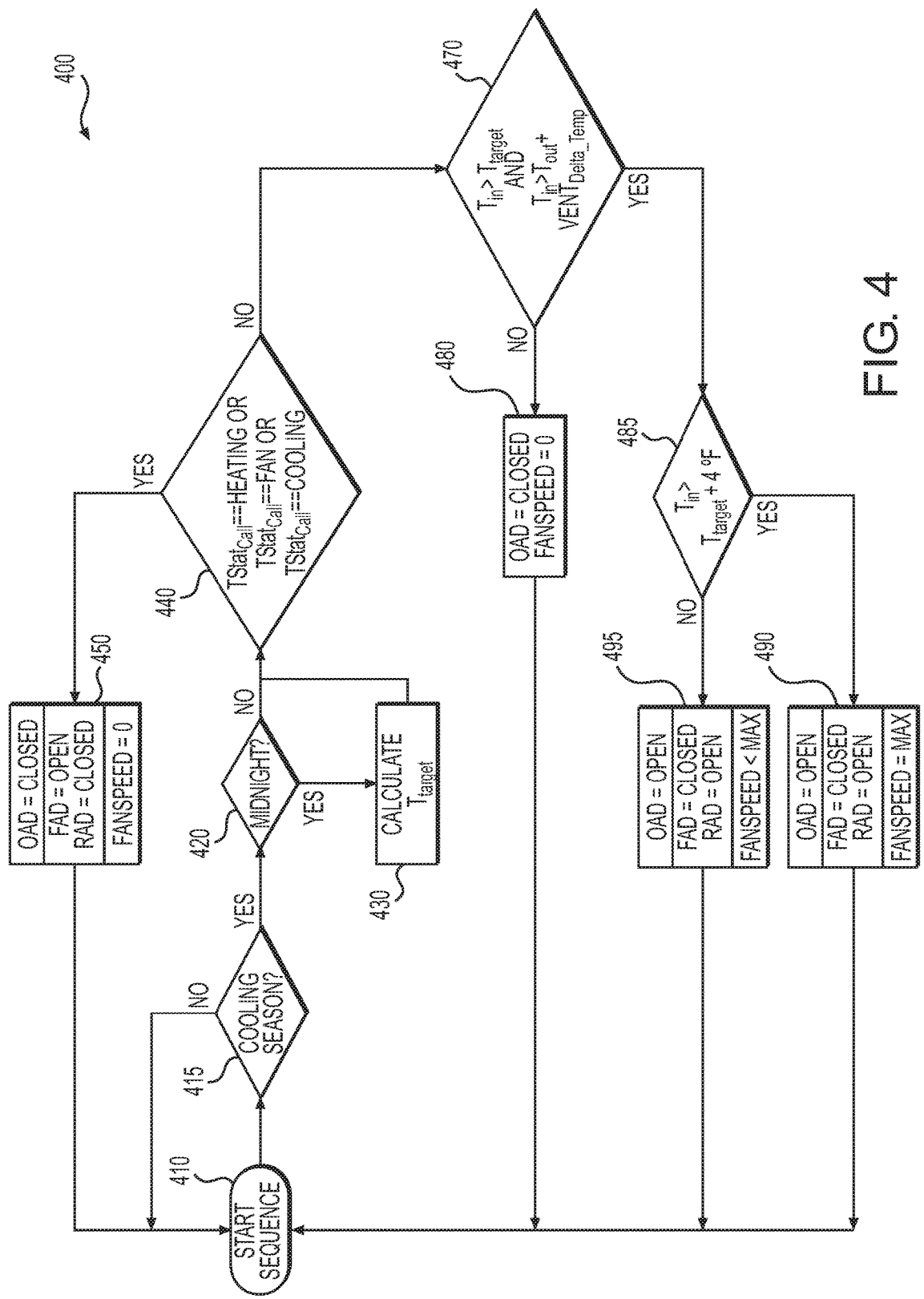
FIG. 4 is a flowchart illustrating methods of controlling devices in an HVAC system using a secondary controller.

FIG. 4 illustrates an exemplary process flow 400 of controlling multiple HVAC devices in a coordinated fashion while maintaining the primacy of the primary controller 140 and its operation of the primary devices—in this embodiment being the furnace 165 and the condenser/compressor 160. More specifically, FIG. 4 illustrates an exemplary process flow chart of controlling a supplementary ventilating device when the primary controller 140 is not causing the primary furnace/HVAC device or its component furnace fan 170 to operate. The secondary device, being in this instance the ventilation system 180, is then operated so as to draw in outside air and distribute it to the conditioned space so as to pre-cool and/or ventilate the conditioned space.

The method begins at step 410. At step 415, the secondary controller 145 determines if it is cooling season, i.e., a time of the year when the indoor space is likely to require cooling at some point during the day. At step 420, the secondary controller 145 determines if the time of day is a preselected time, being midnight in this example. If yes, the processor of the secondary controller 145 proceeds to step 430 and calculates a target temperature (Ttarget) using a program based upon algorithms designed to determine a target temperature to which to pre-cool the conditioned space using outside air. The target temperature is calculated such that if the conditioned space is pre-cooled to the target temperature, the need to cool the building during the heat of the day using condenser/compressor 160 will be reduced or eliminated and the total energy used to maintain comfort in the conditioned space will be minimized, including the energy consumed by the secondary fan and motor 171. For example, if the forthcoming day's weather is forecast to be hot, with a high of 100° F., Ttarget may be calculated at 65° F., calling for a significant amount of pre-cooling. However, if the forthcoming day's weather is forecast to be mild, with a high of 80° F., Ttarget may be calculated at 70° F., calling for a modest amount of pre-cooling.

The method then continues to step 440, where the processor of the secondary controller 145 determines if there is an active call from the thermostat 110 for heating (Tstatcall=Heating) or for cooling (Tstatcall=Cooling) or for operation of the furnace fan 70 (Tstatcall=Fan). If there is an active call for heating, for cooling, or for operation of the furnace fan 170, the processor of the secondary controller 145 proceeds to step 450 and signals the outside air damper 175 to close, the furnace air damper 177 to open, the relief air damper 179 to close, and the secondary controller 145 sends no signal to the secondary fan and motor 171, which is indicated as FanSpeed===0. In this manner, control of the furnace fan 170 and the HVAC system 300 is left to the purview of the primary controller 140. The processor then proceeds back to step 410 and restarts the logic sequence.

If the processor of the secondary controller 145 determines in step 440 that there is no call from the thermostat 110 for heating or for cooling or for operation of the furnace fan 170, then the processor proceeds to step 470 to determine if conditions are advantageous for pre-cooling the conditioned space with outside air. To accomplish this, the processor determines if the indoor temperature (Tin) exceeds the target temperature (Ttarget) previously calculated at step 430 for the current day. The processor also determines if the indoor temperature (Tin) exceeds the outdoor temperature (Tout) by the increment VENTDeltaTemp, which is typically set at a value in the range of about −2-20° F., 2-10° F., or 3-5° F. If either or both of these conditions do not exist, the processor proceeds to step 480 having determined that conditions are not advantageous for pre-cooling. The secondary controller 145 then sends no signal to the secondary fan and motor 171, which is indicated as FanSpeed=0, and the secondary controller 145 sends a signal to the outdoor air damper 175 to close so that no outside air is introduced into the HVAC system 300. The processor then proceeds to step 410 and restarts the logical sequence.

If at step 470 the processor of the secondary controller 145 determines that the indoor temperature (Tin) exceeds the target temperature (Ttarget) and that the indoor temperature (Tin) exceeds the outdoor temperature (Tout) plus the increment VENTDeltaTemp, the processor proceeds to step 485, having determined that conditions are indeed advantageous for pre-cooling. At step 485, the processor of the secondary controller 145 determines whether the indoor temperature (Tin) is close to the target temperature (Ttarget) by a set minimum, in this example 4° F. If the indoor temperature (Tin) exceeds the target temperature (Ttarget) plus the set amount, then the processor proceeds to step 490 and the secondary controller 145 sends signals to the outdoor air damper 175 to open, to the furnace air damper 177 to close, and to the relief air damper 179 to open. The secondary controller 145 also sends a signal to the secondary fan and motor 171 to run at a maximum fan speed previously entered as input by the user. This is indicated as FanSpeed=Max. In this manner, outside air is drawn in by the secondary fan and motor 171 and is distributed through the ducts to the conditioned space to pre-cool it with outside air. The processor of the secondary controller 145 then proceeds to step 410 and restarts the logic sequence.

If at step 485 the processor determines that the indoor temperature (Tin) is within the set amount (in this example 4° F., but may be any value in the range of from 2-10° F., for example) of the target temperature (Ttarget), then the processor proceeds to step 495 and the secondary controller 145 sends signals to the outdoor air damper 175 to open, to the furnace air damper 177 to close and to the relief air damper 179 to open. The secondary controller 145 also sends a signal to the secondary fan and motor 171 to run at a speed less than the maximum. This is indicated as FanSpeed<Max. As the indoor temperature (Tin) gets closer to the target temperature (Ttarget), the processor calculates lower fan speeds according to its algorithm and the secondary controller 145 sends signals to the secondary fan and motor 171 accordingly. In this manner, the system 300 gradually diminishes the amount of air distributed by the ventilation system to the conditioned space for purposes of pre-cooling. After completing step 495, the processor of the secondary controller 145 proceeds to step 410 and restarts the logic sequence.

In some embodiments, the method of controlling the HVAC system 300 includes opening the outdoor air damper 175, closing the furnace air damper 177, opening the relief air damper 179 and operating the secondary fan and motor 171 for purposes of providing outside air for ventilation when there are no calls from the thermostat 110 for heating or for cooling or for operation of the furnace fan 170. Ventilation air improves indoor air quality and may also be required to meet ventilation standards and/or building codes.

In some embodiments, the method of controlling the HVAC system 300 includes opening the outside air damper 175, closing the furnace air damper 177, opening the relief air damper 179 and operating the secondary fan and motor 171 when desired by the user when there are no calls from the thermostat 11 ( ) for heating or for cooling or for operation of the furnace fan 170. To initiate this operation, the user activates a toggle switch, button or some other input icon on the user interface 120. The user interface 120 then sends an input signal to the secondary controller 145 and the secondary controller 145 then sends the appropriate signals to those components.

In some embodiments, the secondary controller 145 is programmed to provide a specified level of outside air per specified time increment (e.g. 24 hours.) In this instance, if the secondary controller 145 determines through its algorithms that the secondary fan and motor 171 have not operated long enough to deliver the specified level of outside air, then the secondary controller 145 sends appropriate signals to the ventilation system 180 to open the outdoor air damper 175 and operate the secondary fan with motor 171 so as to provide additional outdoor air. If the furnace fan with motor 170 is operating at the time, the secondary controller 145 will modulate the speed of the secondary fan with motor 171, signal both the outdoor air damper 175 and the furnace air damper 177 to open or partially open, and signal the relief air damper 179 to close. If the furnace fan with motor 170 is not operating at the time, then the secondary controller 145 will signal the furnace air damper 177 to close and the relief air damper 179 to open.

In some embodiments, this disclosure enables an aftermarket controller to be incorporated into an existing control scheme to enable complimentary operation of a secondary device in a manner that is coordinated with the original and primary device.

In some embodiments, this disclosure enables an aftermarket controller to be incorporated into an existing control scheme to add supplemental control to achieve additional functionality of all or part of the equipment being controlled, without interfering with the primary control scheme. In one such embodiment of the current disclosure, a secondary controller can enable the fan of an HVAC system to distribute outdoor air to cool and freshen a building.

In some embodiments, an HVAC system can be used to provide heat to an additional portion of a building, to water, or for another process or purpose. For example, if the secondary controller detects that the primary controller is not sending any signals to operate the HVAC system, then the secondary controller may send signals that operate the HVAC system and shunt its output via dampers and/or valves to different portions of the associated building.

While the invention has been described in conjunction with the specific exemplary embodiments thereof, it is evident that many alternatives, modifications, and variations will be apparent to those skilled in the art. Accordingly, exemplary embodiments of the invention as set forth herein are intended to be illustrative, not limiting. There are changes that may be made without departing from the spirit and scope of the invention.

What is claimed is:

1. A secondary controller for use in an HVAC system that provides air to a conditioned space, where the HVAC system further includes a primary controller that receives primary input signals from a thermostat and sends primary output signals to control at least one primary device that supplies heated and/or cooled air to the conditioned space and is selected from at least one of the group consisting of a heater, a cooler, and a primary blower that blows the heated and/or cooled air, and the secondary controller is configured to send secondary control signals to control at least one secondary device that is configured to supply outdoor air to the conditioned space and is selected from at least one of the group consisting of an outdoor air damper in communication with the outdoor air and a secondary blower that blows the outdoor air, the secondary controller including a processor programmed to:
(a) determine at least one of (i) whether the primary input signals are being sent to the primary controller, and (ii) whether the primary output signals are being sent from the primary controller; and
(b) send secondary control signals to control the at least one secondary device, the secondary control signals being based on the determination in (a).

2. The secondary controller according to claim 1, wherein the processor is programmed to send secondary control signals to control the at least one secondary device so that outdoor air is introduced into the conditioned space if it is determined that (i) the primary input signals are not being sent to the primary controller, and/or (ii) the primary output signals are not being sent from the primary controller.

3. The secondary controller according to claim 2, wherein the processor is further programmed to:
send secondary control signals to control the at least one secondary device so that outdoor air is not introduced into the conditioned space if it is determined that (i) the input signals are being sent to the primary controller, and/or (ii) the output signals are being sent from the primary controller.

4. The secondary controller according to claim 3, wherein the secondary controller is configured to periodically or continuously monitor at least one of the input signals and the output signals.

5. The secondary controller according to claim 1, wherein the at least one primary device includes the heater, the cooler, and the primary blower, and the processor is programmed to send secondary control signals to control the at least one secondary device to introduce outdoor air into the conditioned space if it is determined that (i) the primary input signals are not being sent to the primary controller to control any of the heater, the cooler, and the primary blower, and/or (ii) the primary output signals are not being sent from the primary controller to control any of the heater, the cooler, and the primary blower.

6. The secondary controller according to claim 5, wherein the processor is further programmed to send secondary control signals to control the at least one secondary device so that outdoor air is not introduced into the conditioned space if it is determined that (i) the input signals are being sent to the primary controller to control any of the heater, the cooler, and the primary blower, and/or (ii) the output signals are being sent from the primary controller to control any of the heater, the cooler, and the primary blower.

7. The secondary controller according to claim 6, wherein the processor is further programmed so that, if it is determined that an outdoor air ventilation threshold of the interior space has not been met, the secondary controller nonetheless sends secondary control signals to control the at least one secondary device to introduce outdoor air into the conditioned space.

8. The secondary controller according to claim 2, wherein the processor is further programmed to:
determine whether an indoor temperature of the conditioned space exceeds an outdoor temperature by a first predetermined threshold amount; and
send the secondary control signals to control the at least one secondary device to introduce outdoor air into the conditioned space if it is determined that the indoor temperature of the conditioned space exceeds the outdoor temperature by the first predetermined threshold amount.

9. The secondary controller according to claim 8, wherein the processor is further programmed to:
determine whether an indoor temperature of the conditioned space exceeds an indoor target temperature by a second predetermined threshold amount; and
send the secondary control signals to control the at least one secondary device to introduce outdoor air into the conditioned space if it is determined that the indoor temperature of the conditioned space exceeds the target temperature by the second predetermined threshold amount.

10. The secondary controller according to claim 9, wherein the processor is further programmed to:
determine whether a difference between the indoor temperature of the conditioned space and the indoor target temperature is within a third predetermined threshold amount; and
send the secondary control signals to control the at least one secondary device to introduce outdoor air such that the at least one secondary device operates at a lesser capacity to supply relatively lesser outdoor air as compared with when the secondary device is operating at full capacity.

11. The secondary controller according to claim 1, wherein the at least one primary device includes the primary blower and the at least one secondary device includes the outdoor air damper, and outdoor air can be drawn through the outdoor air damper by operating the primary blower, and wherein the processor is further programmed to send secondary control signals to operate both the primary blower and the outdoor air damper to introduce outdoor air into the conditioned space if it is determined that (i) the primary input signals are not being sent to the primary controller, and/or (ii) the primary output signals are not being sent from the primary controller.

12. The secondary controller according to claim 1, wherein the secondary controller is configured to receive sensor information from both an indoor temperature sensor that senses a temperature of the conditioned space and an outdoor temperature sensor that senses an outdoor temperature.

13. The secondary controller according to claim 1, wherein the secondary controller includes an internet connection and is configured to receive weather information from the internet.

14. The secondary controller according to claim 2, wherein the at least one secondary device further includes a furnace air damper that controls the supply of the heated and/or cooled air from the at least one primary device, and wherein the processor is programmed to close the furnace air damper if the secondary controller sends secondary control signals to introduce outdoor air into the conditioned space.

15. The secondary controller according to claim 2, wherein the at least one secondary device further includes a relief air damper that allows excess air in the HVAC system to escape, and wherein the processor is further programmed to open the relief air damper if the secondary controller sends secondary control signals to introduce outdoor air into the conditioned space.

16. A secondary controller that controls at least one secondary device that supplies outdoor air to an interior space, the secondary controller being configured to be used with a primary controller that controls at least one primary device that supplies heated and/or cooled air to the interior space, wherein the secondary controller is configured to detect primary control signals sent to and/or from the primary controller, and is configured to control the at least one secondary device based on the detection such that the at least one secondary device (i) does not supply outdoor air when the at least one primary device is supplying cooled and/or heated air; or (ii) operates at a lesser capacity to supply relatively lesser outdoor air when the at least one primary device is supplying cooled and/or heated air as compared with when the secondary device is operating at full capacity.

17. The secondary controller according to claim 16, wherein the secondary device includes a blower with a variable speed motor to blow the outdoor air to the interior space, and the secondary controller is configured to control the blower to (i) turn off when the at least one primary device is supplying cooled and/or heated air; or (ii) operate the variable speed motor at a speed less than a highest speed.

18. The secondary controller according to claim 16, wherein if it is determined that (i) an outdoor air ventilation threshold of the interior space has not been met; and (ii) the at least one primary device is supplying cooled and/or heated air, the secondary controller is configured to control the at least one secondary device to operate at the lesser capacity.

19. The secondary controller according to claim 16, wherein the primary device includes a furnace that supplies heated air to a supply duct of the interior space, and the secondary device is configured to supply the outdoor air to the supply duct at a position that is downstream from the furnace.

20. An outdoor air cooling and ventilation apparatus for supplying outdoor air to an indoor space, the apparatus comprising a single housing that includes:
  (i) an outdoor air inlet that is configured to receive the outdoor air into the housing;
  (ii) an outdoor air damper positioned downstream of the outdoor air inlet, the outdoor air damper being able to regulate the flow of the outdoor air in the housing;
  (iii) an outlet that is configured to supply the outdoor air to the indoor space;
  (iv) a fan with a fan motor that is configured to draw in the outdoor air through the outdoor air inlet and blow the outdoor air to the outlet;
  (v) a conditioned air inlet that is configured to receive conditioned air from an HVAC system into the housing; and
  (vi) a conditioned air damper that is positioned downstream of the conditioned air inlet, the conditioned air damper being able to regulate the flow of the conditioned air in the housing.

21. The outdoor air cooling and ventilation apparatus according to claim 20, further comprising a plenum upstream from the outlet, wherein the plenum is arranged to receive both the outdoor air and the conditioned air.

22. The outdoor air cooling and ventilation apparatus according to claim 21, further comprising a relief air damper positioned downstream of the conditioned air inlet and upstream of the conditioned air damper.

* * * * *